US011547059B2

(12) United States Patent
Duijn et al.

(10) Patent No.: US 11,547,059 B2
(45) Date of Patent: Jan. 10, 2023

(54) METHOD AND DEVICE FOR TWISTING A BUNDLE OF PLANT STEMS IN A BOUQUET

(71) Applicant: Havatec B.V., Nieuw-Vennep (NL)

(72) Inventors: Arend van Duijn, Katwijk (NL); John Wijnands, Noordwijk (NL)

(73) Assignee: Havatec B.V., Nieuw-Vennep (NL)

( * ) Notice: Subject to any disclaimer, the term of this patent is extended or adjusted under 35 U.S.C. 154(b) by 62 days.

(21) Appl. No.: 16/631,797

(22) PCT Filed: Jun. 27, 2018

(86) PCT No.: PCT/NL2018/050417
§ 371 (c)(1),
(2) Date: Jan. 16, 2020

(87) PCT Pub. No.: WO2019/017770
PCT Pub. Date: Jan. 24, 2019

(65) Prior Publication Data
US 2020/0205350 A1    Jul. 2, 2020

(30) Foreign Application Priority Data

Jul. 17, 2017    (NL) .................................... 2019256

(51) Int. Cl.
*A01G 5/02*    (2006.01)
(52) U.S. Cl.
CPC ...................... *A01G 5/02* (2013.01)
(58) Field of Classification Search
CPC ...................................................... A01G 5/02
(Continued)

(56) References Cited

U.S. PATENT DOCUMENTS

| 2,553,103 A | 5/1951 | Miller |
| 3,250,209 A * | 5/1966 | Gage ............... B65B 13/345 |
| | | 100/26 |

(Continued)

FOREIGN PATENT DOCUMENTS

| CO | 07046096 A | 5/2007 | |
| DE | 10201947 A1 * | 8/2002 | ............... A01G 5/02 |

(Continued)

OTHER PUBLICATIONS

European Patent Office, International Search Report in corresponding International Application No. PCT/NL2018/050417, dated Sep. 20, 2018 (3 pages).

(Continued)

*Primary Examiner* — Brady W Frazier
*Assistant Examiner* — Zoe Tam Tran
(74) *Attorney, Agent, or Firm* — Leydig, Voit & Mayer, Ltd.

(57) ABSTRACT

For forming a "wheatsheaf" bunch of flowers, a bundle of stems is twisted. For that purpose, use is made of a first and second rotatable receiving unit which keep flowers or groups of flowers separated from each other transversely to the axial direction relative to a rotation axis of the receiving unit. A multiplicity of stems are introduced in lying orientation in axial direction relative to the rotation axis into the receiving units, with a part of each bouquet component extending over a distance between the first and second rotatable receiving unit. The first receiving unit is rotated between the feeding of different bouquet components, while the second receiving unit rotates substantially along with the first receiving unit. Thereupon, a relative rotation angle between the first and second receiving unit is changed to twist the bundle of stems. After changing of the relative rotation angle, the (Continued)

bundle in the twisted condition is gripped and/or bound and taken out of the receiving units.

30 Claims, 9 Drawing Sheets

(58) Field of Classification Search
USPC .......................................... 47/58.1 CF, 41.01
See application file for complete search history.

(56) References Cited

U.S. PATENT DOCUMENTS

| | | | | |
|---|---|---|---|---|
| 3,659,709 | A * | 5/1972 | Bartlett, Jr. | B65G 17/34 |
| | | | | 209/551 |
| 4,041,672 | A * | 8/1977 | Gularte | A23N 15/003 |
| | | | | 53/399 |
| 4,534,817 | A * | 8/1985 | O'Sullivan | B29C 65/08 |
| | | | | 100/26 |
| 4,704,846 | A * | 11/1987 | Lev | A23N 15/003 |
| | | | | 100/6 |
| 5,157,899 | A * | 10/1992 | Tas | A01G 5/00 |
| | | | | 198/431 |
| 5,791,134 | A * | 8/1998 | Schneider | B65H 57/20 |
| | | | | 57/11 |
| 5,946,897 | A * | 9/1999 | Ichikawa | H01B 13/0207 |
| | | | | 57/25 |
| 6,167,919 | B1 * | 1/2001 | Fuchsl | H01B 13/0207 |
| | | | | 140/149 |
| 6,345,659 | B1 | 2/2002 | Molenaar et al. | |
| 6,457,276 | B1 * | 10/2002 | Masters | A01G 5/04 |
| | | | | 428/23 |
| 6,502,368 | B1 * | 1/2003 | Grether | A01G 5/02 |
| | | | | 53/219 |
| 6,519,924 | B1 * | 2/2003 | Barz | A01G 5/02 |
| | | | | 57/10 |
| 6,674,037 | B2 * | 1/2004 | Ruigrok | H01B 13/227 |
| | | | | 156/50 |
| 7,213,365 | B2 * | 5/2007 | Van Zuylen | B65H 57/20 |
| | | | | 57/11 |
| 8,234,850 | B1 * | 8/2012 | Wright | H01R 43/20 |
| 8,438,780 | B1 | 5/2013 | Malavenda | |
| 8,701,342 | B2 * | 4/2014 | Malavenda | B29C 65/08 |
| | | | | 100/26 |
| 9,078,479 | B2 * | 7/2015 | Wright | A41F 9/002 |
| 10,723,584 | B2 * | 7/2020 | Estermann | H01R 43/20 |
| 2003/0089033 | A1 * | 5/2003 | Wimp, Jr. | A01G 5/04 |
| | | | | 47/41.11 |
| 2004/0154221 | A1 * | 8/2004 | De Wit | A41F 9/002 |
| 2006/0288641 | A1 * | 12/2006 | Cardamone | H01B 13/0207 |
| | | | | 57/25 |
| 2014/0352867 | A1 * | 12/2014 | McLane | H01B 13/227 |
| | | | | 156/50 |
| 2015/0059240 | A1 | 3/2015 | Van Bers | |

FOREIGN PATENT DOCUMENTS

| | | | | |
|---|---|---|---|---|
| DE | 102010060200 A1 * | 5/2012 | | A01G 5/02 |
| EP | 0672341 A2 * | 9/1995 | | A01G 5/00 |
| EP | 1446003 A1 | 8/2004 | | |
| FR | 3040374 A1 | 3/2017 | | |
| GB | 2271752 A | 4/1994 | | |
| GB | 2491709 A | 12/2012 | | |
| JP | H07-039970 U | 7/1995 | | |
| JP | H11-155371 A | 6/1999 | | |
| JP | 2005-508649 A | 4/2005 | | |
| JP | 2008029217 A * | 2/2008 | | A01G 5/04 |
| KR | 20020090585 | 12/2002 | | |
| KR | 20100027756 A * | 3/2010 | | A01G 5/02 |
| KR | 200452463 Y1 * | 2/2011 | | A01G 5/02 |
| KR | 20120125008 A * | 11/2012 | | A01G 5/02 |
| KR | 20130014356 A * | 2/2013 | | A01G 9/086 |
| NL | 1009091 A1 | 4/1999 | | |
| NL | 1030314 C2 | 5/2007 | | |
| NL | 1039397 C | 8/2013 | | |
| NL | 1040275 C | 5/2015 | | |
| WO | WO 01/17331 A1 | 3/2001 | | |
| WO | WO 03/041629 A1 | 5/2003 | | |
| WO | WO2003039241 A1 * | 5/2003 | | A01G 5/02 |
| WO | WO 2013/125943 A1 | 8/2013 | | |
| WO | WO 2017/032937 A1 | 3/2017 | | |

OTHER PUBLICATIONS

Industria y Comercio, Colombian Search Report in corresponding Colombian patent application NL20200001014 dated Dec. 1, 2020 (2 pages).

* cited by examiner

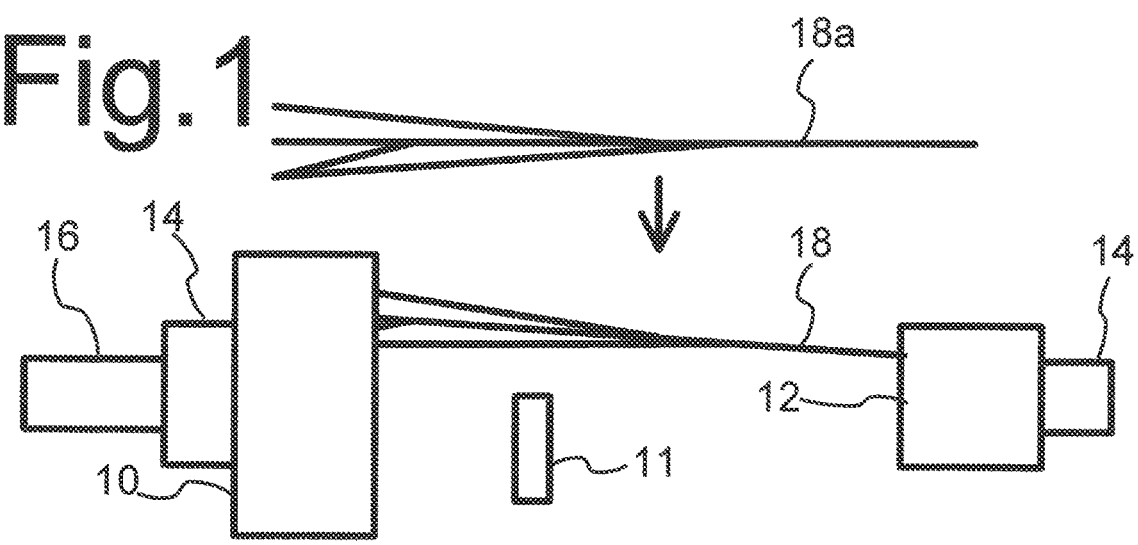
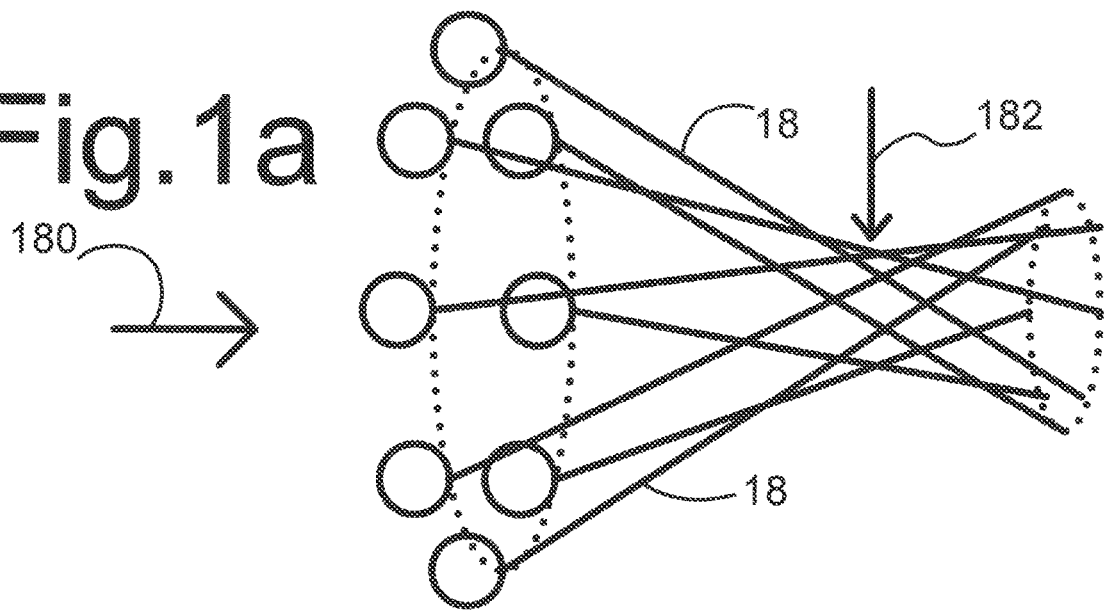

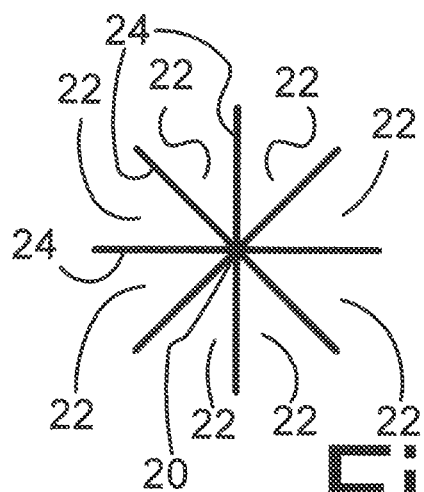
Fig.2
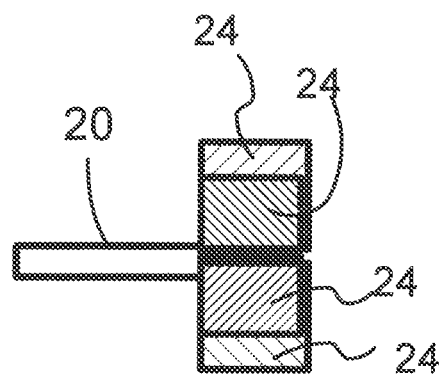
Fig.2a
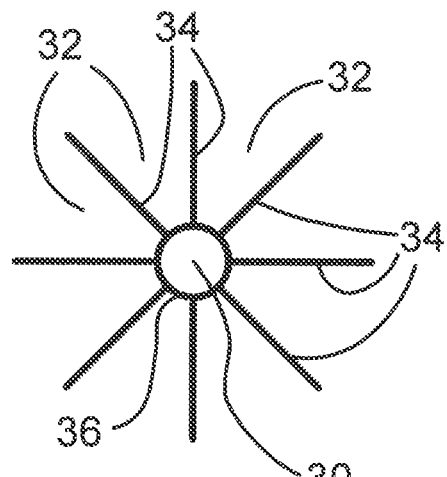
Fig.3
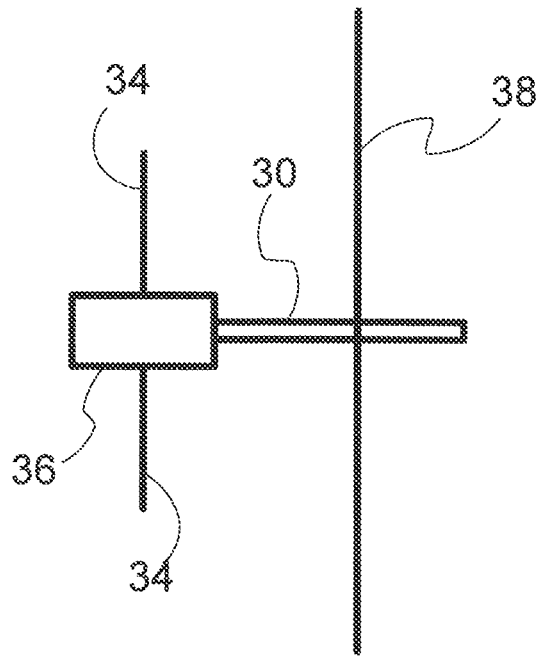
Fig.3a

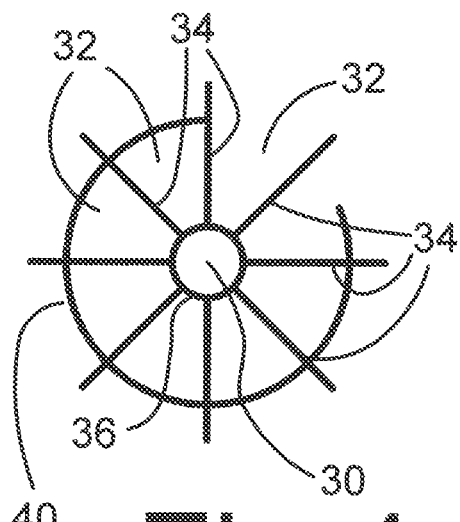
Fig.4
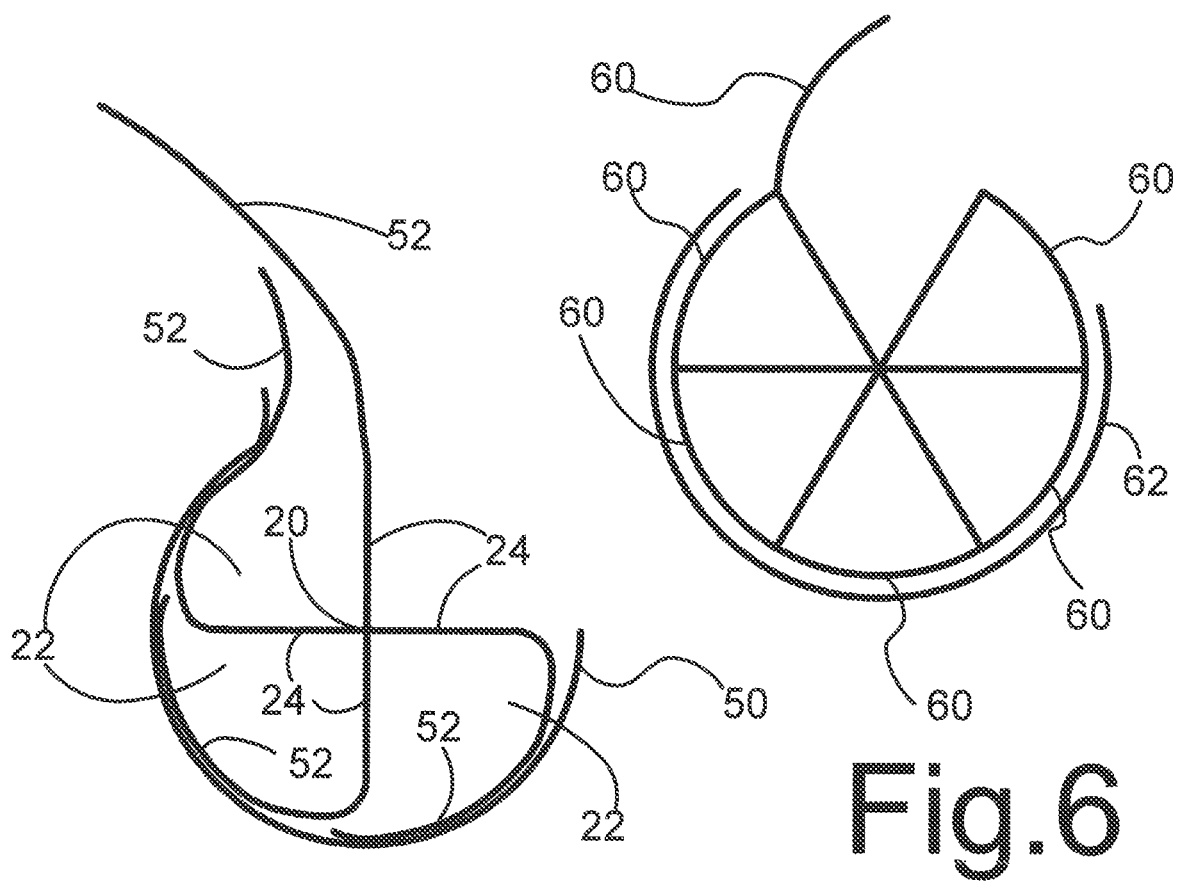
Fig.5
Fig.6

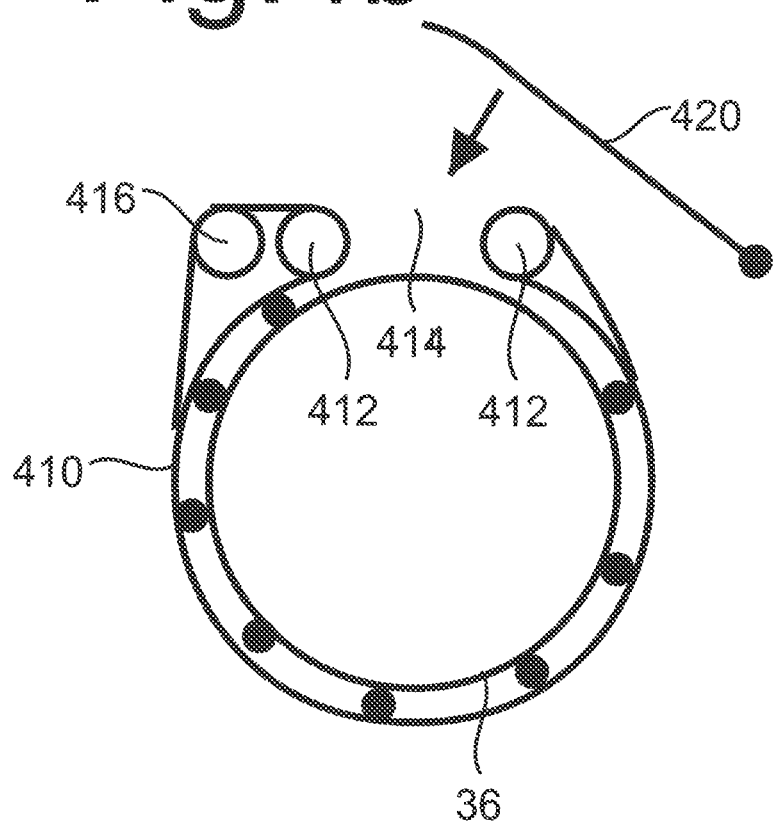

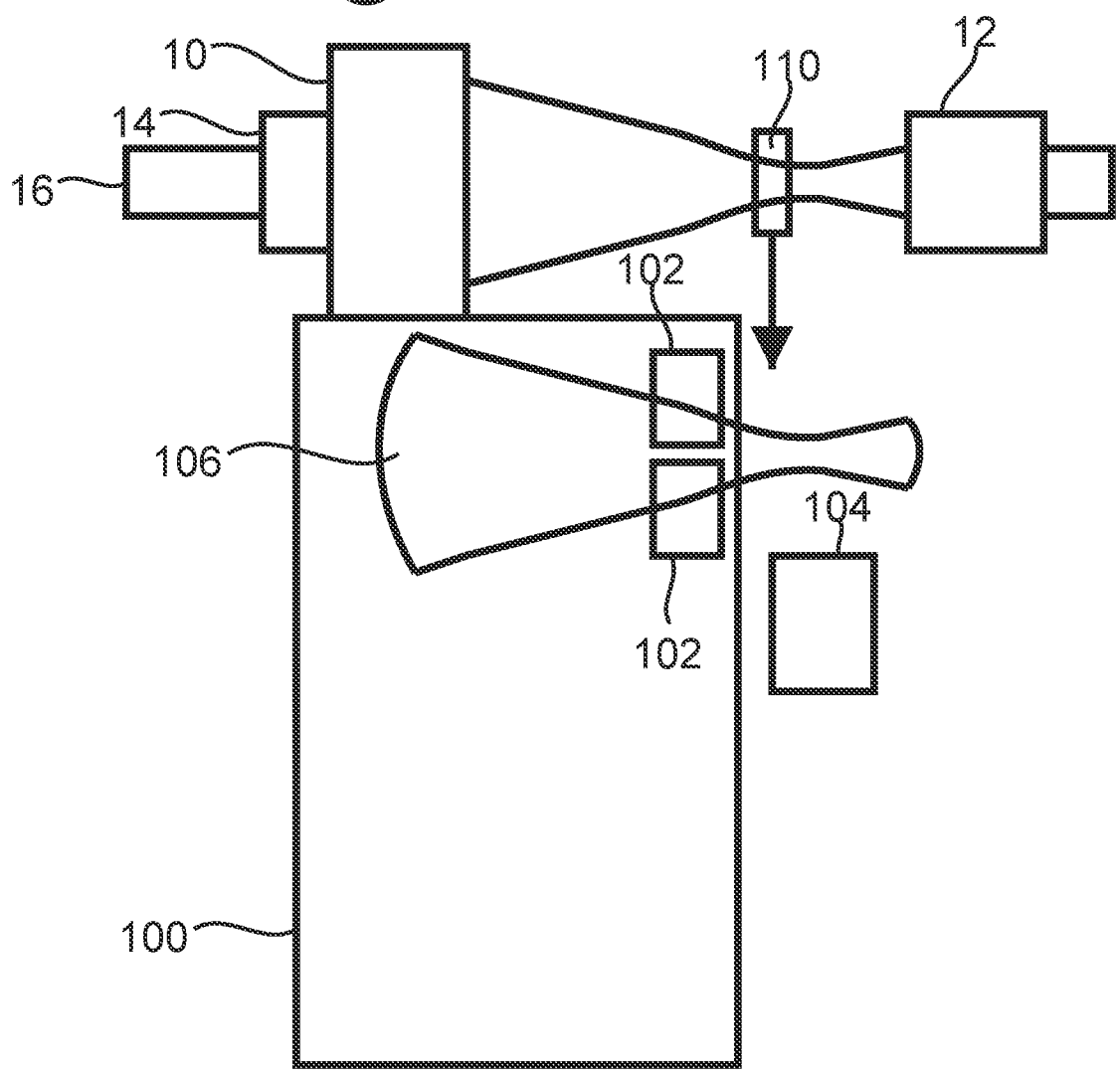

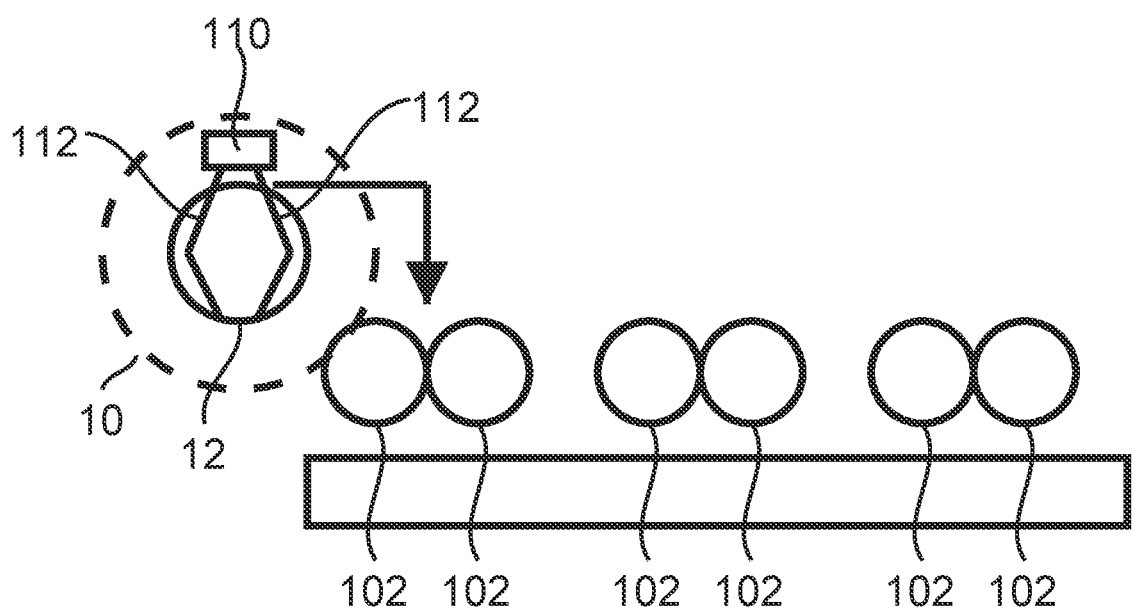

METHOD AND DEVICE FOR TWISTING A BUNDLE OF PLANT STEMS IN A BOUQUET

CROSS-REFERENCE TO RELATED APPLICATIONS

This patent application is a U.S. National Phase of PCT International Application No. PCT/NL2018/050417, filed Jun. 27, 2018, which claims priority to Netherlands Application No. 2019256, filed Jul. 17, 2017, which are both expressly incorporated by reference in their entireties, including any references contained therein.

FIELD OF THE INVENTION

The invention relates to a device for twisting a bundle of plant stems in a bouquet.

BACKGROUND

FIG. 1a illustrates twisting of a bundle of plant stems. The diameter of the bundle upon twisting is narrowest in a crossing area 182 between the ends of the bundle, at a substantial distance from both ends. Instead of fanning out from an (imaginary) central crossing point, the closest distances of the stems to the central axis of the bundle are in the crossing area at a distance from the central axis of the bundle, and the orientations of different stems relative to each other are rotated relative to each other around the central axis.

It takes time to make a twisted bundle by hand. An experienced florist does this by laying the stems of different stems one by one in different twisted positions ("different" herein being understood to mean that there is more than one stem involved, not necessarily that it is about differences between the (types of) stems). After this, the bundle is bound, for example with a tape or wire winding around the crossing area. The whole of the twisted bundle and winding is also referred to as "wheatsheaf bunch". NL2008880 proposes a form, for manually inserting the stems, in which the stems standing obliquely are supported in accordance with the twisted positions. A multiplicity of these forms are transported along different work positions, on which workers put different kinds of flowers in the forms.

NL1019351 describes a device for automatically twisting a bundle of stems. The device includes two horizontal gratings above each other, on opposite sides of the crossing area. The stems are initially inserted parallel to each other, each vertically, through openings in the two gratings. Thereupon the two gratings are turned relative to one another about a virtual vertical axis, so that the stems are twisted. After this, the bars forming the top grating are retracted, to allow the bundle to be removed. To that end, the top grating consists of two mutually movable sets of bars, in which the bars within each set are mutually parallel, and the bars of the different sets are transverse to each other.

This device has the disadvantage that inserting the stems through two openings in the gratings is cumbersome. The alignment of the flowers in the bundles is determined by the gratings and an optional extra support of the stems, as a result of which the relative height of the flowers in the bundle is not properly controllable.

SUMMARY

One object, among others, is to provide a less laborious manner of forming a bouquet with a twisted bundle of stems.

There is provided a device for twisting a bundle of stems of bouquet components, comprising a first and second rotatable receiving unit, having rotation axes being at least substantially in line with each other, arranged to receive bouquet components lying, with first and second axial parts of the bouquet components respectively in the first and second receiving unit, while a part of each bouquet component between the first and second axial part extends over a distance between the first and second rotatable receiving unit, wherein first means for keeping the first axial parts of the bouquet components at least partly separated from each other transversely to the axial direction relative to a rotation axis of the first receiving unit;

second means for keeping the second axial parts of the bouquet components at least partly separated from each other transversely to the axial direction relative to a rotation axis of the second receiving unit;

wherein the first and second means at least at receiving of the first and second axial part of the bouquet components are accessible radially relative to the rotation axes for receiving; and the device further comprises first driving means coupled to the first and second receiving unit, configured to rotate the first receiving unit around the rotation axis between the receiving of different bouquet components, while the second receiving unit rotates substantially along with the first receiving unit, and thereupon to change a relative rotation angle between the first and second receiving unit;

second driving means coupled to the first and/or second receiving unit, configured to make space for taking out a bundle formed by the bouquet components in the first and second rotatable receiving unit.

The radial accessibility of the means for keeping the bouquet components axially separated makes introducing the bouquet elements simple. This also makes it easier to introduce, if so desired, small groups of stems at the same time.

The means for keeping at least partly separated from each other transversely to the axial direction relative to a rotation axis, can keep individual bouquet components or groups of bouquet components separated from each other, for example in spaces separated by walls, or, for example in the second receiving unit, by clamping the bouquet components or groups of bouquet components at different angular positions around the rotation axis, or by clamping bouquet components or groups of bouquet components in such a manner that they separate other received bouquet components or groups of bouquet components from each other, so that the order of the other bouquet components around the rotation axis is preserved. If use is made of partition walls or pins, these preferably extend in a direction radial from the rotation axes, in consequence of which the opening diverges from the rotary axes in the radial direction, which simplifies deposition. Also, use of a lying position simplifies introducing the stems.

First driving means rotate the receiving units around rotation axes which are at least substantially in line with each other. The first driving means can include, for example, two motors which are coupled to the respective receiving units, or a single motor with transmissions that are coupled to the respective receiving units, or a hand and/or foot operation. The first driving means rotate the first receiving unit around the rotation axis between the feeding of different bouquet components into the spaces of the first receiving unit, for example after one or more bouquet components have been introduced into a space. Doing so, the first driving means rotate the second receiving unit substantially along with the first receiving unit. In this way, a bundle of bouquet components is formed which projects between the receiving units. Thereupon, the first driving means rotate the receiving units relative to each other, as a result of which the bundle is twisted.

Thereupon, second driving means coupled to the first and/or second receiving unit make space for taking out a bundle formed by the bouquet components in the first and second rotatable receiving unit. The space needed can be made, for example, by temporarily enlarging the distance between (parts of) the receiving units, or by temporarily removing any obstacles to removal of the bundle.

An embodiment provides a device for twisting a bundle of stems of bouquet components, comprising:

a first and second rotatable receiving unit, having rotation axes being at least substantially in line with each other, arranged to receive bouquet components lying, while a part of each bouquet component extends over a distance between the first and second rotatable receiving unit, wherein the first receiving unit comprises a first multiplicity of first spaces separated at least in part from each other transversely to the axial direction relative to a rotation axis of the first receiving unit, for reception of a first axial part of the bouquet components;

the second receiving unit comprises a second multiplicity of second spaces separated at least in part from each other transversely to the axial direction relative to a rotation axis of the second receiving unit, for reception of a second axial part of the bouquet components; and the device further comprises first driving means coupled to the first and second receiving unit, configured to rotate the first receiving unit around the rotation axis between the feeding of different bouquet components into the first spaces, while the second receiving unit rotates substantially along with the first receiving unit, and thereupon to change a relative rotation angle between the first and second receiving unit;

second driving means coupled to the first and/or second receiving unit, configured to make space for taking out a bundle formed by the bouquet components in the first and second rotatable receiving unit. Herein, preferably, at least at receiving, the spaces are accessible radially relative to the rotation axes for receiving the bouquet components.

BRIEF DESCRIPTION OF THE FIGURES

These and other purposes and advantages will be apparent from the following description of exemplary embodiments with reference to figures in which FIG. 1 shows an embodiment of a device for twisting stems FIG. 1a shows a twisted bundle of stems FIGS. 2, 2a show transverse views of the first receiving unit FIGS. 3, 3a show views of the second receiving unit FIG. 5 illustrates an embodiment with a ring FIG. 6 illustrates an embodiment with pivotable valves FIGS. 10a-d show a processing station.

DESCRIPTION OF EXEMPLARY EMBODIMENTS

Figure 4A:
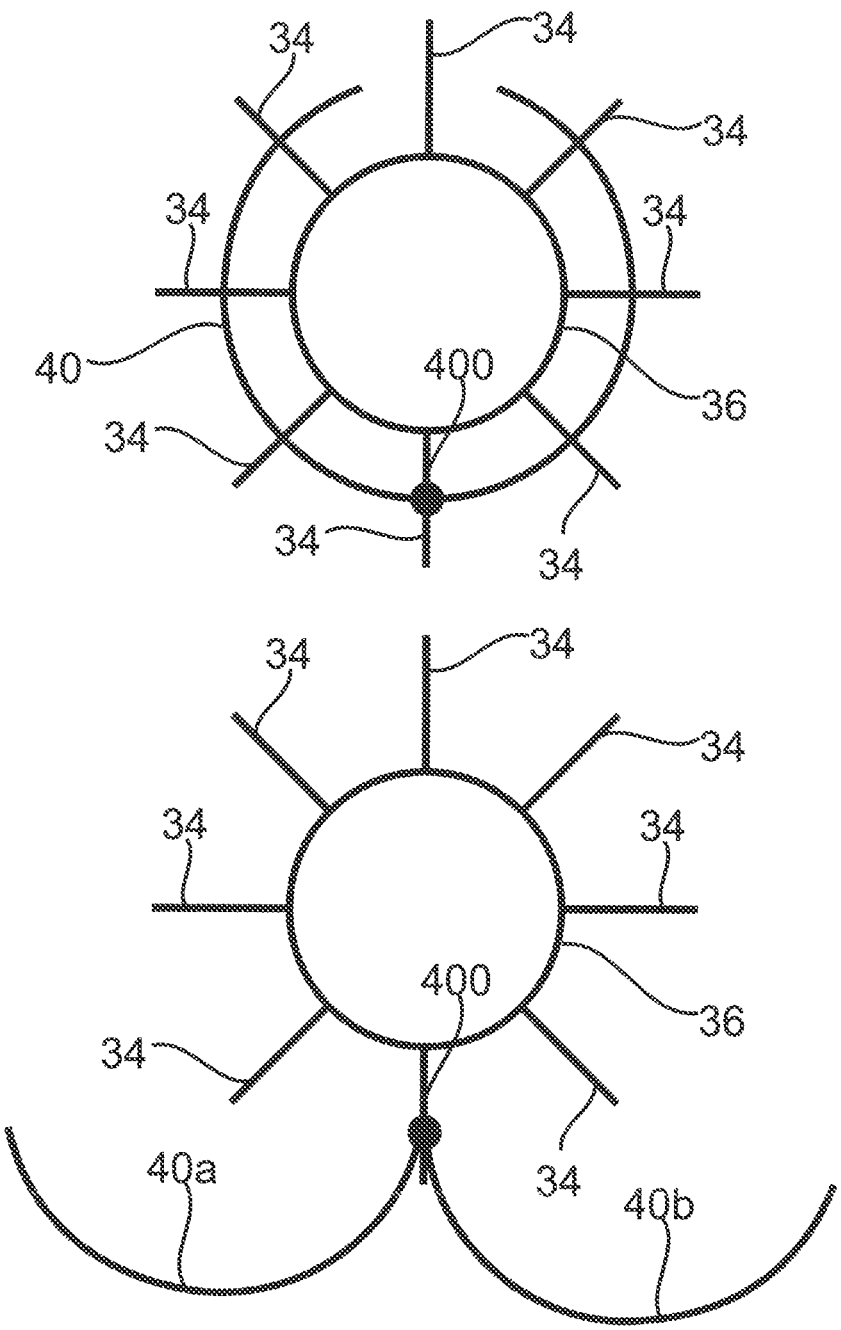
FIG. 4 illustrates an embodiment with a ring FIGS. 4a,b illustrate implementations of the second receiving unit

FIG. 1 shows an embodiment of a device for twisting stems of a bundle of bouquet components, for forming a bouquet. The term "bouquet component" is here used in a broad sense for the whole of a stem in combination with foliage, flowers and/or (flower) buds which are on the stem. The term stem is used in a broad sense for a stalk, branch and/or stalk with branches, etc. One end of a bouquet component consists substantially exclusively of a narrow stem, while the other end is wider, with foliage, flowers, (flower) buds and/or bifurcations. The ends will be respectively referred to as the narrow and wide end of the bouquet component. The part of the stem that is essentially just as narrow as the narrow end of the stem will be designated as the narrow part of the stem.

The direction from the narrow end to the center of the wide end will be designated as the axial direction of the bouquet component. The term "axial part" of a bouquet component will be used for a part of the bouquet component that is in a partial range of positions along the axial direction, and axial parts of different bouquet components in the same partial range of positions along the axial direction will be designated as corresponding axial parts.

FIG. 1 shows a device with a first and second rotatable receiving unit 10, 12 and first and second driving means 14, 16. The first and second receiving unit 10, 12 are configured to receive the bouquet components 18, 18a lying, with the axial direction of the bouquet components 18, 18a substantially parallel to each other, with first and second axial parts of each bouquet component 18, 18a in at least partly mutually separated spaces in the first and second receiving unit 10, 12, respectively, so that an intermediate part of an axial length of the bouquet component between the first and second axial part of the bouquet component extends between first and second receiving unit 10, 12. For this purpose, at least at reception, the spaces are accessible radially relative to the rotation axes. The spaces can form sections, with separation elements such as walls or pins between the spaces.

Further, FIG. 1 shows an optional support element 11 between first and second receiving unit 10, 12, which does not have to be arranged rotatably, for supporting the bouquet components between first and second receiving unit 10, 12. One support element 11 or a plurality of support elements at different positions between first and second receiving unit 10, 12 can be used against sagging of bouquet components to positions that are lower than first receiving unit 10. Support element 11 may for example be in the form of a half ring in a plane perpendicular to the axial direction between first and second receiving unit 10, 12, below the level of the rotation axis. When the bouquet components are received in oblique orientation, the ring may, in accordance with the position between first and second receiving unit 10, 12 and the obliqueness, be placed to a greater or lesser extent above the lowermost level of first receiving unit 10 and have a smaller or greater diameter. In an embodiment, support element 11 can be folded open, to simplify the bundle being taken out.

The first driving means 14 are configured to rotate first and second receiving unit 10, 12, with different rotation modes being possible, including a rotation mode in which a relative rotation angle of the first and second receiving unit 10, 12 relative to each other changes for the purpose of twisting the bundle, and a rotation mode in which first and second receiving unit 10, 12 preserve substantially the same relative orientation, with at most small relative orientation changes relative to each other. The second driving means 16 are configured to make space to take out the bouquet components 18, 18a after twisting. To that end, the second driving means 16 may be configured, for example, to enlarge the axial distance between the first and second receiving unit 10, 12, but the space needed may also be created otherwise, for example by retracting the partitions between the different stems.

The first driving means 14 may be configured for manual drive, for example with the aid of handles, handwheels or a foot pedal and possibly a transmission, for rotating along substantially equally and changing the relative rotation angle. The second driving means 16 may also be configured for manual drive.

In an embodiment, first driving means 14 include one or more motors, which are connected directly or via a transmission, for example with chains, to the rotation axes 20, 30 of first and second receiving unit 10, 12. In this embodiment, the device includes a control unit configured to control the switching on and off and optionally the rotation direction of the motors. In a simple embodiment, the control unit includes one or more switches, with a neutral position, one or more positions to rotate the receiving units substantially equally with the motor or motors, and a twisting position to change with the motor or motors a relative rotation angle around rotation axes 20, 30 relative to each other. The latter may for example be done simply by just rotating around one of the rotation axes 20, 30, or rotating around both rotation axes in mutually opposite directions, or rotating at different rotational speeds and/or or in different rotational directions. In another embodiment, the control unit includes a computer, which provides for corresponding neutral, equal rotation and twisting control conditions and actuation of the motors depending on the condition.

In operation, bouquet components are laid one by one and/or group by group in the device, with a part at the wide end of the bouquet component or group lying in a space in first receiving unit 10, and a part at the narrow end of the bouquet component or group lying in second receiving unit 12. Thereupon, first receiving unit 10 is rotated and a next bouquet component or group is laid by the wide end in a next space in first receiving unit 10, and by the narrow end in second receiving unit 12. The spaces are at least partly separated from each other in the sense that the spaces are formed between separations of the spaces which upon rotation keep the bouquet components separated from each other in different spaces. In this way, upon rotation, the bouquet components are carried along in the spaces. In an embodiment, the first receiving unit 10 is rotated each time through an angular range of one space, so that in succession in all spaces of the first receiving unit 10 bouquet components can be introduced. But it is also possible to leave spaces empty, by rotating, in-between the introduction of consecutive bouquet components, through the angular range of a plurality of spaces. It is also possible to introduce bouquet components into a plurality of different spaces without rotating intermediately, and to defer rotating, at the latest, until there are no empty spaces accessible from above anymore.

Upon rotation of the first receiving unit for introducing the bouquet components, second receiving unit 12 is rotated substantially along with first receiving unit 10. Rotating substantially along is understood to mean rotating that ensures that an overlap, in the circular direction, between spaces in the first and second receiving unit 10, 12 remains present, at least at times when bouquet components are introduced. An example is rotating simultaneously through a same angular range, but rotating substantially equally does not exclude rotations being carried out at different times between the introduction of bouquet components. Nor does it exclude the second receiving unit 12 not being rotated, so that rotation of the first receiving unit through the angular range of one or even two spaces may come to lag behind or lead ahead of rotation of the second receiving unit, or if such is not necessary for maintaining overlap.

The numbers of spaces in the first and second receiving unit may differ. For example, if the number of spaces in the first receiving unit is a multiple of the number of spaces in the second receiving unit, rotating substantially along does not exclude either that the second receiving unit is not rotated until after rotation of the first receiving unit through such multiple of spaces.

The spaces in, for example, the second receiving unit can extend in the circular direction around the rotation axis through a greater angular range than in the first receiving unit. A space in the second receiving unit can then at the same time at least partly overlap a plurality of spaces in the first receiving unit. In that case, rotating substantially along neither precludes the second receiving unit not being rotated if the space in the first receiving unit where the next bouquet component will be introduced remains, before and after rotation, in overlap with a same space in the second receiving unit.

Rotating the first receiving unit and rotating the second receiving unit substantially along is repeated for a number of bouquet components or groups. Thereupon, the bundle formed by all received bouquet components together is twisted by changing the relative rotation angle of the first and second receiving unit 10, 12 relative to each other, for twisting the bundle of stems of the received bouquet components 18, 18a, as shown in FIG. 1a. The relative angular change of the position of the stems in the receiving units is, for example, at least 90 degrees, for example between 120 and 180 degrees. In practice, the relative angular change between the receiving units used for this purpose may be somewhat greater than that of the stems, for example, the angular range of one space extra. Thereupon, second driving means 16 make space for taking out the twisted bundle, for example by enlarging the distance between first and second receiving unit 10, 12. Before that, the bundle may be bound to form a bunch, while the ends are still in the receiving unit, by laying windings around the crossing area 18a. But this can also be done after taking out, if the bundle, for the purpose of taking it out, is grasped in such a way that the twist is not lost.

First and second receiving unit 10, 12 may, between the laying-in of successive bouquet components, be rotated strictly equally, but this is not requisite. Second receiving unit 12 may for example lag or lead by a few rotations and/or be rotated to catch up each time only after a multiplicity of rotations of first receiving unit 10 (for example, after two or three rotations). In an embodiment, second receiving unit 12 includes fewer spaces for reception of bouquet components than first receiving unit 10, while at least a part of the spaces in second receiving unit 12 includes more bouquet components than the spaces in first receiving unit 10.

FIG. 2 shows a cross section of an embodiment of the first receiving unit 10, in a plane perpendicular to the rotation axis 20 of first receiving unit 10. The first receiving unit 10 includes a multiplicity of spaces 22 at least partly separated from each other transversely to the axial direction relative to rotation axis 20, each for reception of the first axial parts of one or more individual bouquet components, with the rest of the axial length of each bouquet component projecting axially from the space 22 concerned. The physical rotation axis does not have to extend to any point between spaces 22: it suffices for the spaces to project transversely to the axial direction from a virtual rotation axis in line with the physical rotation axis. The surface of the partitions between the spaces is so directed that with the partitions forces can be transferred which have a component around the rotation axis, perpendicular to the axial and radial direction. The surface of the partitions between the spaces extends in the axial direction preferably parallel to the rotation axis. The partitions separate the spaces preferably transversely to a circular direction around the rotation axis. The separations between the spaces can extend radially relative to the rotation axis, but the separations can also be at an angle to the radial direction, as long as they are not exclusively perpendicular to the radial direction. Nor do the partitions have to be planar. They can have, for example, a bent or angled surface, which is throughout parallel to the axial direction, but the angle of which extends along the radial direction. This can improve the lie of bouquet components. The specific number of spaces 22 shown in the figure is only an example: preferably, there are at least three spaces, and larger numbers of spaces may be used. In the embodiment shown, the first receiving unit 10 has spaces 22 for corresponding axial parts which include the wide end of the bouquet components. In the embodiment shown, the first receiving unit 10 has partition walls 24 between spaces 22, partition walls 24 running out from rotation axis 20 of first receiving unit 10.

FIG. 2a shows a view of a further embodiment of first receiving unit 10, in a plane parallel to the rotation axis. Partition walls 24 at different angles are herein represented with different hatching. All partition walls 24 preferably have the same axial length L, but it is also possible to use different lengths. The axial length of each of the partition walls 24 is preferably a length that is sufficiently great to enable a reception of the bouquet components that is independent of differences in length of the bouquet components and shifts upon twisting, while the axial length of partition walls 24 is sufficiently great to transmit forces onto the bouquet components without the bouquet components bending away from spaces 22. For example, L is at least five or ten centimeters.

Optionally, first receiving unit 10 can include a stop plate on the axial side of first receiving unit 10 remote from second receiving unit 12 (so that the spaces in the first receiving unit are between the stop plate and the second receiving unit), perpendicular to the rotation axis (not represented in the figure). Partition walls 24 may be attached to this stop plate, with the stop plate rotating along with partition walls 24. In another embodiment, the stop plate may be arranged at a distance from partition walls 24, with partition walls 24 mounted on the rotation axis.

Second receiving unit 12 may be implemented the same way as first receiving unit 10, but because first receiving unit 10 is for the wide part of the bouquet components and second receiving unit 12 for the narrow part, it may be advantageous to use mutually different first and second receiving units 10, 12. It may be advantageous for twisting to include in second receiving unit 12 means to keep the stems spaced from the rotation axis, whereas for the first receiving unit this may be superfluous because the wide parts of the bouquet components in the first receiving unit 10 can take care of the distance themselves. On the other hand, it may be advantageous to take extra measures in first receiving unit 10 to protect the bouquet components, that are superfluous in the second receiving unit 12 because the wide parts are more vulnerable than the narrow end of the stem.

FIG. 3 shows a transverse view of an embodiment of the second receiving unit 12, perpendicular to the rotation axis 30 of second receiving unit 12. The second receiving unit 12 likewise includes a multiplicity of spaces 32 at least partly separated from each other transversely to the axial direction. The specific number of spaces shown in the figure is merely an example. The number of spaces in second receiving unit 12 may differ from that in first receiving unit 10. Preferably, the number in second receiving unit 12 is smaller.

In the embodiment shown, the second receiving unit 12 has spaces 32 for an axial part of the narrow part of the stems of the bouquet components. Spaces 32 are at a distance from the rotation axis 30 of second receiving unit 12. In the embodiment shown, second receiving unit 12 includes a thickening 36 around the rotation axis and a multiplicity of pins 34 which project from thickening 36 radially relative to the rotation axis 30, or are arranged on the rotation axis next to thickening 36, with pins 34 constituting the sole separations between spaces 32. If the pins are arranged on the rotation axis next to thickening 36, the pins preferably project beyond the thickening, to the effect that the pins are able to carry along the stems of the bouquet components upon rotation. Instead of pins, also partition walls can be used that extend further in the direction of the rotation axis 30. But pins already suffice as separation.

FIG. 3a shows a section of the second receiving unit in a plane including the rotation axis 30 of the second receiving unit. In the embodiment shown, the second receiving unit includes an optional stop plate 38 perpendicular to rotation axis 30, at a distance from pins 34. Stop plate 38 is on the axial side of the second receiving unit that is remote from the first receiving unit, so that pins 34 are between stop plate 38 and the first receiving unit. Stop plate 38 can be used for aligning the ends of the stems. In an embodiment, the device includes means to adjust thickening 36 and pins 34 and stop plate 38 axially relative to each other and/or relative to the first receiving unit. Thickening 36 and stop plate 38 may for example be provided with clamps to clamp thickening 36 and stop plate 38 on axis 30.

The distance between first receiving unit 10 and stop plate 38 can be adjusted to the length of the bouquet components used. At a given distance between first receiving unit 10 and stop plate 38, the position and/or diameter of thickening 36 between first receiving unit 10 and stop plate 38, if desired together with the position of the pins, may be adjusted to adjust the position of the crossing area 182 in the axial direction of the bundle. In this way, the device can be set to bring the crossing area to a desired position between, for example, a tenth and half of the length.

In an embodiment, the device includes means for adjusting the position of stop plate 38 during twisting, to compensate for shortening of the bundle during twisting. These means can include, for example, a spring to urge stop plate 38 to the first receiving unit during or after twisting, and/or a motor and a motor control which is configured to adjust the position of stop plate 38 in combination with the change of the relative orientation of the receiving units. The desired relation between orientation and position can be simply determined experimentally.

Thickening 36 ensures that the narrow ends of the stems upon twisting are kept at a distance from rotation axis 30, as necessary for a twisted bundle, and prevents problems due to intertwining of the stems. A comparable thickening around the rotation axis can also be used in first receiving unit 10, but can have a greater or smaller diameter there or even be omitted because of the greater width of the bouquet components at the wide end.

To keep the narrow ends of the stems at a distance from rotation axis 30 during twisting, it may suffice for the thickening 36 in the second receiving unit to be a thin disc on a mechanical rotation axis. A plurality of discs may be used on the rotation axis. The thickening 36 can be cylinder- or cone-shaped, for example with an angle between the outer surface of thickening 36 with respect to the rotation axis that corresponds to the angle of the narrow ends of the stems with respect to the rotation axis. Also, the mechanical rotation axis as a whole may be implemented to be so thick as to fulfill the function of thickening 36 to keep the narrow ends of the stems at a distance from rotation axis 30 upon twisting. In the embodiments, a thickening 36 is shown for this purpose, but it should be understood that it can be replaced with other means for achieving this function.

As an alternative to the embodiment in which the second driving means make space to take out the bundle by enlarging the distance between the receiving units, the second driving means may also be configured to fold pins 32 away or collapse them to make space for removal. The diameter of thickening 36 can be kept so small that it does not hinder removal.

As shown in FIG. 1, the first and second receiving unit 10, 12 are so arranged relative to each other that each bouquet component 18, 18a can be inserted in lying position with different axial parts of the bouquet component 18 in spaces 22, 32 of first and second receiving unit 10, 12, and continuing to lie therein (as shown, obliquely relative to the horizontal). In the embodiment shown, the rotation axes of first and second receiving unit 10, 12 are arranged horizontally. But also an oblique setup may be sufficient for use of a lying bouquet component, as long as the connecting line between the spaces 22, 32 on first and second receiving unit 10, 12 upon insertion substantially deviates from the vertical, that is, at least so far that the bouquet component cannot fall over (for example, at least 30 degrees). The rotation axes 20, 30 of the first and second receiving unit 10, 12 are preferably in line with each other, but a radial offset or an angle between the rotation axes 20, 30 is not precluded, as long as deposition and rotation of the bouquet components is possible.

In the embodiments shown of first and second receiving unit 10, 12, these preferably comprise means to prevent bouquet components 18, 18a, upon rotation downwards, from possibly falling out of spaces 22, 32. Otherwise the usable rotation angle is limited to an angular range in which the radial access to spaces 22, 32 continues to face up at least partly. This can be taken care of by one or more optional support elements 11 which are configured to intercept the stems, if the receiving units rotate the stems to the underside of the receiving units, and to support the stems at least through the angular range in which the stems face down at the underside of the receiving units.

FIG. 4 illustrates an embodiment of the device in which around second receiving unit 12 a ring 40 is included which is fixedly arranged so that ring 40 does not rotate along with the rotation axis 30 of second receiving unit 12. Ring 40 can be placed in a position displaced relative to pins 34 in the axial direction of rotation axis 30, around or next to thickening 36, and preferably has an inner diameter which is less than the diameter of the circle described by the end of the pins during rotation and greater than the diameter of thickening 36. In the upper half of ring 40 is an opening which allows radial insertion of ends of stems or groups of stems of the bouquet components between pins 34. Ring 40 constitutes a protection of the spaces 32, at least at the underside of the spaces. In operation, this protection ensures that the stems cannot fall out of spaces 32 when they are rotated down. As a consequence, random rotations of second receiving unit 12 can be used. The ring can also be in the form of a (partial) cylinder which in the axial direction is much longer than its radial thickness: the term "ring" is not meant to imply any limitation of the length/thickness ratio. As an alternative to ring 40, other types of protection may be used as well, such as closures between pins 34, or other separations, with which the circumferences of spaces 32 are closed after insertion of the bouquet components in the spaces.

In an embodiment, thickening 36 has a resilient surface, for example in that thickening 36 comprises a foam layer, or as a whole consists of foam rubber. In this embodiment, thickening 36 has such a diameter that the narrow end of the stems of the bouquet components that are between thickening 36 and ring 40 are pressed against ring 40 by thickening 36. This can prevent the bouquet components possibly shifting in their length direction. Pins 34 can here be used to push the narrow ends of the stems around the rotation axis. When thickening 36 can carry along the ends of the stems itself, pins 34 might be omitted.

In this embodiment, ring 40, in order for the bunch to be taken out, is preferably removed separately from thickening 36. As shown in FIG. 4a, halves 40a,b of ring 40 may be separately rotatably mounted on a hinge 400 under thickening 36, so that halves 40a,b can be pivoted around a pivoting axis parallel to the rotation axis of second receiving unit 12, away from thickening 36.

Further, second receiving unit 12 may comprise a mechanism to urge the narrow end of the stems on thickening 36 out of the opening to a position between thickening 36 and ring 40. This function can be carried out with pins such as pins 34, or with a pivotable hammer or with a press-on mechanism to press the narrow ends of the stems radially against thickening 36, as described within the framework of FIG. 4b.

In an embodiment, the circumference of thickening 36 comprises axially running grooves in which the ends of the stems can be carried along. The grooves may be so shallow that the ends of the stems project radially from the grooves.

In these and other embodiments in which the narrow ends of the stems are clamped against thickening 36, the function of stop plate 38 is, in principle, redundant. Stop plate 38 may hence be omitted. In an embodiment, the device is configured to move stop plate 38, after twisting, from a distance from the narrow ends of the stems against the narrow ends of the stems. In this way, an extra aligning step can be realized. Instead of a single thickening on the rotation axis, also, at different axial positions, different thickenings may be included, for example a first thickening at the axial position of ring 40 and a second thickening at the axial position of pins 34. The thickening which keeps the ends of the stems farthest from the rotation axis during twisting, determines the position of the narrowest part of the twisted bundle. Any other thickenings do not need to play a role in this.

FIG. 4b shows an embodiment in which the narrow ends of the stems are kept separate, not by means of separations, but instead by means of a press-on belt 410. Second receiving unit 12 in this embodiment includes a press-on belt 410, and return pulleys 412 to pull press-on belt 410 around thickening 36, and a tensioner, so that the narrow ends of the stems of the bouquet components are clamped between press-on belt and thickening. Thickening 36 and/or press-on belt 410 are preferably provided with a resilient layer, for example of foam rubber.

The track shows an opening 414 which enables radial insertion of the narrow ends of the stems or groups of stems to the thickening. Opening 414 can extend, for example, over an angular segment of thickening 36. Press-on belt 410 preferably extends around thickening 36 so far that press-on belt 410 prevents the bouquet components possibly falling off thickening 36.

The device preferably comprises a drive 416, for example a motor, which is configured to drive the press-on belt at a speed corresponding to the rotation speed of the thickening, so that the part of press-on belt 410 facing thickening 36 has a same angular speed as thickening 36. It can suffice, however, to drive just one of thickening 36 and press-on belt 410 and thereby carry along the other, for example by a coupling by means of carrier elements on thickening 36 which engage in openings in press-on belt 410 or the other way around, or by a different coupling, for example friction between a part of thickening 36 and press-on belt 410. In an embodiment, the device further includes a pivotably arranged press-on arm 420.

In use, at insertion, the narrow ends of the stems are laid in the opening 414, after which the narrow ends of the stems by rotation of thickening 36 are guided between press-on belt 410 and thickening 36. The individual narrow ends of stems are thereby kept clamped during twisting, each at their own position between press-on belt 410 and thickening 36. Press-on belt 410 and thickening 36 in this way provide for separation and, if necessary, for carrying along of the narrow ends of the stems during twisting. In a further embodiment, the circumference of the thickening 36 is provided with axially running grooves in which the ends of the stems can be carried along. The grooves may be so shallow that the ends of the stems project radially from the grooves.

In the embodiment with press-on arm 420, press-on arm 420 serves to press the narrow ends of the stems radially against thickening 36 while the narrow end of the stem is guided between press-on belt 410 and thickening 36. Press-on arm 420 is pivotable about a pivoting point 422.

Prior to placement of the narrow end of a stem, press-on arm 420 is in an initial position at a distance from thickening 36, to allow the narrow end to pass to opening 414. After placement of the narrow end, press-on arm 420 is rotated until press-on arm 420 presses the narrow end radially against thickening 36. The end of press-on arm 420 may for example be in the form of a fork, with tines at the end of a rod, which move along press-on belt 410 and return pulleys 412. The part of press-on arm 420 that makes contact with the end of the stems is of a material that is so smooth (for example, of Teflon) as to allow the narrow end of the stem to move along with rotation of thickening 36. The narrow end of the stem is thereby passed between thickening 36 and press-on belt 410. Thereupon, press-on arm 420 can be rotated back to the initial position again.

In an embodiment, press-on arm 420 is configured to be slid in and out, and press-on arm 420 is slid in in the initial position so that more space is available to insert a bouquet component, and press-on arm 420 is slid out after insertion to press-on the end of the stem.

Return pulleys 412 are preferably displaceable in order for press-on belt 410 to be removed from thickening 36 for the purpose of taking out the bunch.

In another embodiment, a multiplicity of radially projecting grippers may be mounted on the rotation axis of second receiving unit 12, in which, in use, the narrow ends of stems of different bouquet components or groups of bouquet components are introduced. In this embodiment, each gripper includes fingers to enclose and/or clamp the introduced stem or stems.

In the embodiments where the narrow ends of the stems are clamped, it is not strictly necessary to process the bouquet components continuously in lying orientation.

Around first receiving unit 10, a same kind of ring can be included as around second receiving unit 12, preferably an axially wider ring which extends throughout the axial range of partition walls 24. As the wide end of the bouquet components is more vulnerable than the narrow end, preferably additional measures are taken to prevent damage to the bouquet components.

FIG. 5 illustrates an embodiment of the device that includes a fixedly arranged ring 50 around the first receiving unit. In the upper half, ring 50 has an opening which allows radial insertion of stems or groups of stems of the bouquet components. In the illustrated embodiment of the first receiving unit, flexibly resilient flaps 52 are included which are connected to partition walls 24, and project radially beyond the end of the partition walls 24 to a length that is greater than the radius of ring 50. For example, flaps 52 are just as long as ring 50 in axial direction. Ring 50 can constitute a casing around flaps 52. Instead of a single ring 50, a multiplicity of rings at different axial positions may be used.

In use, ring 50, where present, forces, upon rotation of first receiving unit 10, the end of flaps 52 to follow the inner circumference of ring 50. In this way, flaps 52, upon rotation of first receiving unit 10, screen off the wide part of the bouquet components at least partly from stationary ring 50, to prevent damage. The length of the flap 52 is preferably at least such that flap 52, in the condition forced by ring 50, extends beyond the radial prolongation of the first partition wall 24 next to the partition wall 24 to which the flap is attached. In this way, the wide parts of the bouquet components are completely screened off from ring 50.

FIG. 6 illustrates an embodiment in which form-retaining valves 60 rotatably (pivotably) coupled to partition walls 24 are used instead of the flaps, to screen off the bouquet components from ring 50 completely. Each valve 60 may comprise a spring to urge valves 60 into an open position in the angular range in which ring 50 during the revolution of the receiving unit is absent. As an alternative, the device may comprise a mechanism to fold valves 60 open where ring 50 is absent, for example with the aid of a pawl on each valve and a fixed guide to urge the pawl of a valve radially outwards at a point in the upper half of first receiving unit 10 where bouquet components can be introduced. Ring 50 may be used as a guide to urge the pawls inside. In another alternative, ring 50 may be omitted and valves 60 may comprise a retaining spring, combined with a mechanism to fold valves 60 open at a point in the upper half of first receiving unit 10 where bouquet components can be introduced.

While embodiments are shown in which each space 22 comprises a flap 52 or valve 60, it can be noted that flap 52 or valve 60 are especially advantageous for spaces 22 whose opening faces down. In an embodiment, they are omitted for spaces 22 whose openings face up at twisting. In use of this embodiment, the spaces 22 whose openings at twisting face up are the last ones to be provided with bouquet components. Use of a flap 52 or valve 60 for all spaces 22 provides the advantage that the first receiving unit can be used in random orientations and that also upwards movements of the bouquet components upon rotation are counteracted.

Figure 7:
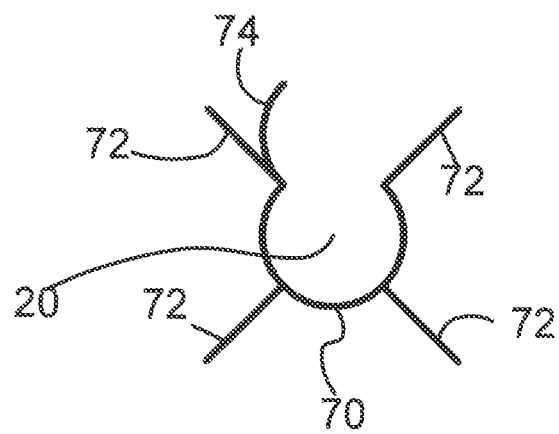
FIG. 7 illustrates an embodiment with a hollow cylinder

FIG. 7 illustrates an embodiment of the first receiving unit comprising a hollow cylinder 70 around rotation axis 20 and partition walls 72 on the outside of cylinder 70 (rotation axis 20 extends only virtually into cylinder 70, and does not have to correspond to a physical structure). Hollow cylinder 70 comprises a movable valve 74 and a mechanism to fold valve 74 open at a point in the upper half of first receiving unit 10 where bouquet components can be introduced, and then to fold valve 74 shut. The mechanism to swing valve 74 open and shut can for example include an electronically controlled carrier. Partition walls 72 on the outside of cylinder 70 are not worked out in detail, but may be implemented as in one of the earlier-described embodiments. In operation, hollow cylinder 70 serves for receiving one or more central bouquet components of a bouquet and spaces around hollow cylinder 70 for peripheral bouquet components of the same bouquet.

Figure 8:
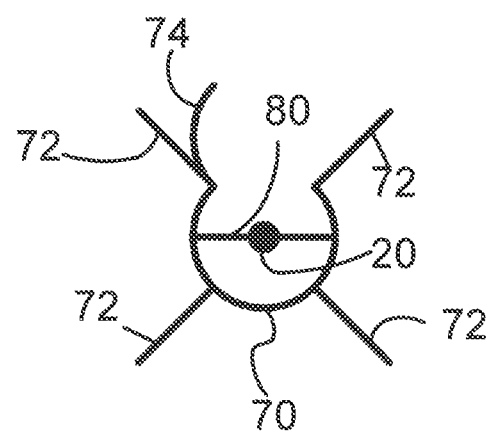
FIG. 8 illustrates an embodiment with partition walls in a cylinder

FIG. 8 illustrates an embodiment of the first receiving unit in which further partition walls 80 are included within cylinder 70. In a further embodiment, further partition walls 80 are rotatable relative to cylinder 70, and partition walls 72 are on the outside of cylinder 70. In an embodiment, the first driving means are configured to first drive partition walls 80 substantially equally along with second receiving unit 12 while cylinder 70 does not rotate. In this way, a plurality of central bouquet components can be introduced via valve 74 into different spaces 82 within cylinder 70. Further, the first driving means are configured to rotate cylinder 70 equally along with second receiving unit 12 at a different time. In this way, more peripheral bouquet components can be introduced into different spaces outside cylinder 70. If desired, the bouquet components inside and outside cylinder 70 may also be differently twisted, by having the first driving means rotate cylinder 70 and further partition walls 80 within cylinder 70 relative to each other in twisting.

The devices of FIGS. 7 and 8 provide for two radial layers of bouquet components, one central layer within cylinder 70 and a second layer which forms a wreath of bouquet components around inner cylinder 70. In a further embodiment, more layers may be used, by including one or more further cylinders concentrically with cylinder 70, with comparable mechanisms for supplying bouquet components between the different cylinders.

It will be clear that also other constructions of first and second receiving unit 10, 12 are possible with a multiplicity of separated spaces. Thus, bins mounted on a plate such as the stop plate may be used, and/or bins which are mounted on the rotation axis via radial pins.

For low volume applications, the bouquet components may be deposited by hand in first and second receiving unit 10, 12, and, after the bundle has been twisted, be taken out and bound. For larger-scale applications, a supply mechanism, a take-out mechanism and/or a binding machine can be used.

Figure 9:
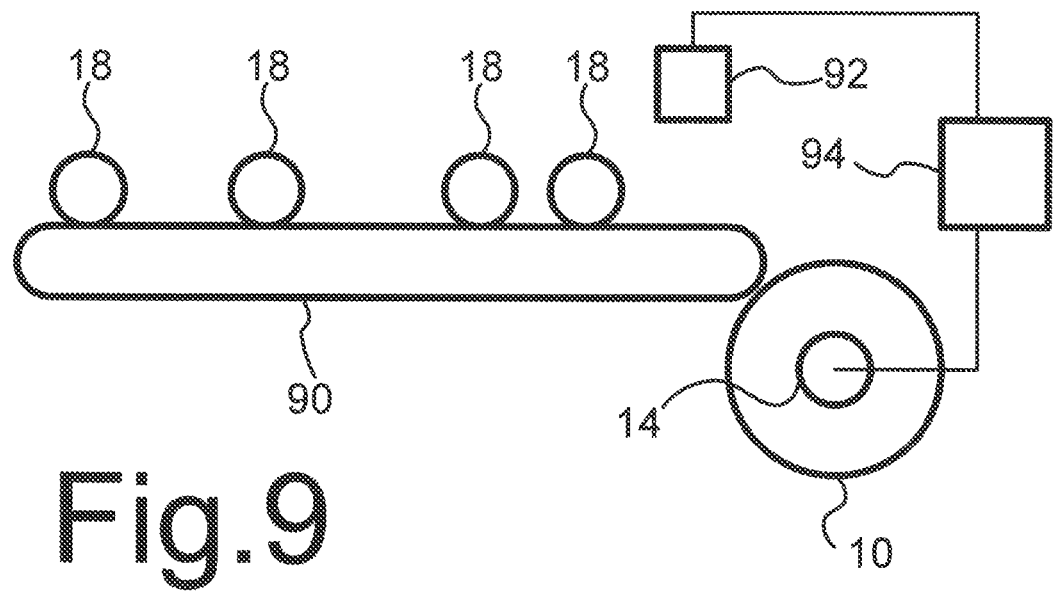
FIG. 9 shows a supply mechanism

FIG. 9 shows a supply mechanism of the device for twisting stems of a bundle of bouquet components, for forming a bouquet. The device includes the earlier-described receiving units and driving means (only first receiving unit 10 visible) and further a feed belt 90, a detector 92 and a control unit 94. Indicated on feed belt 90 are a number of bouquet components 18, which lie on feed belt 90 with the stem transversely to the transport direction of feed belt 90. Feed belt 90 is configured to transport bouquet components 18 to the receiving units and there to deposit them off the end of feed belt 90 into the first and second receiving unit. Detector 92 is configured to detect passage of bouquet components 18. Detector 92 can be, for example, an optical detector.

Control unit 94 is coupled to detector 92 and first driving means 14, and configured to cause the first driving means 14 each time, in response to detection of a predetermined number of bouquet components 18 and/or laid-in groups of bouquet components 18 in a space, to rotate the first and second receiving units 10, 12 substantially equally, through an angle such that a next space on the first and second receiving units is set up to catch bouquet components 18.

Depending on the number of bouquet components that has to be caught, the predetermined numbers can be, for example, one, two or more. Further, the control unit 94 is configured, in response to detection that a predetermined required number of bouquet components for a complete bouquet have arrived, to activate the first driving means 14 to change a relative rotation angle of the first and second receiving units relative to each other, and then to activate the second driving means so that the twisted bundle can be taken out. Control unit 94 can be, for example, a computer, programmed with a program to execute these steps.

In operation, the bouquet components are laid on feed belt 90, for example by hand or with a further machine. Feed belt 90 transports the bouquet components to the first and second receiving units, in which parts of the bouquet components are received in different spaces, and the bundle is thereupon twisted. To the device, further parts may be added, for example for an improved control over the transport of the bouquet components. Thus, one or more guides may be added next to the receiving units to support the bouquet components after feed belt 90 and/or one or more guides to prevent bouquet components from shooting past the first and second receiving units. Such guides can include rotatably arranged wheels, to prevent friction with the bouquet components. Further, one or more foam belts (of foam rubber) or silicone belts may be added above feed belt 90 and/or the guide or guides, which transport along with feed belt 90 to push the bouquet components at the end of feed belt 90 against a part of feed belt 90 and/or the guides.

The device may comprise cutting means, such as a knife or cutting wheel, for cutting off an end of the stems on feed belt 90 or in the path of feed belt 90 to the receiving units. The bouquet components can be laid on feed belt 90 with the wide end aligned at the desired height in the bouquet, for example with the aid of reference marks on feed belt 90, or after laying-on be shifted accordingly, after which the cutting means cut off the ends of the stems at the same height, so that the stop plate of the second receiving unit takes care of the desired height in the receiving units.

Further, one or more pairs of conveyor belts, such as foam belts or silicone belts, for transport from feed belt 90 to the receiving unit may be added. These one or more pairs of conveyor belts are set up to take over bouquet components from the end of feed belt 90, whereby the stem of each bouquet component is clamped between the conveyor belts of the pair. Here, the mouth of the one or more pairs of conveyor belts is so positioned that the bouquet component from the one or more pairs of conveyor belts is supplied from (possibly obliquely) above to the receiving units, so that the bouquet component is deposited in lying orientation in the receiving units.

In a further embodiment, the device includes means for controlling the position of the mouth of the one or more pairs of conveyor belts, and the control unit is configured to control these. The control unit may be configured to deposit bouquet components in this way in different spaces of the first receiving unit and in the second receiving unit without this necessitating intermediate rotation of the first receiving unit.

In an embodiment, the device comprises a binding machine, arranged to bind the stems between the first and second receiving units after twisting, for example with tape or wire. This may be done, for example, before the second driving means are activated.

In an embodiment, the device includes a gripper arranged to grip the bundle of stems between the first and second receiving units after twisting. This may be done, for example, before the second driving means are activated. The gripper may be configured to transport the gripped bundle to a next processing station. The bundle may then be bound, for example, in the next processing station, or after this station.

For not further automated applications, the bundle may also be gripped and/or bound by hand, so that no gripper and/or binding machine is used then.

Figure 10A:
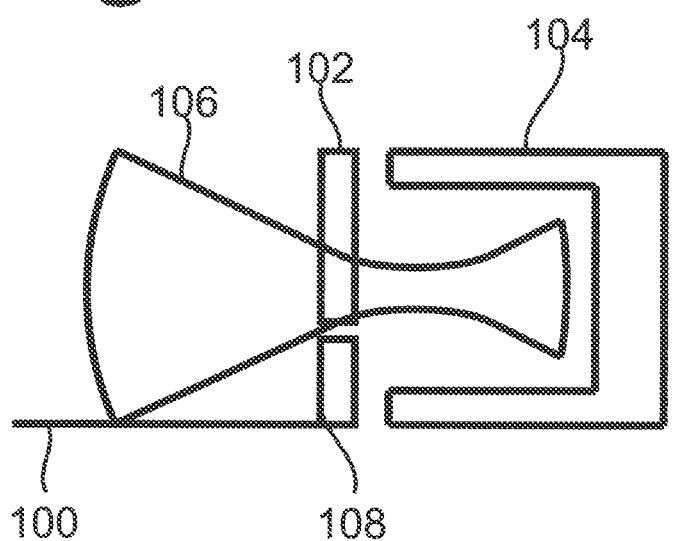
Figure 10B:
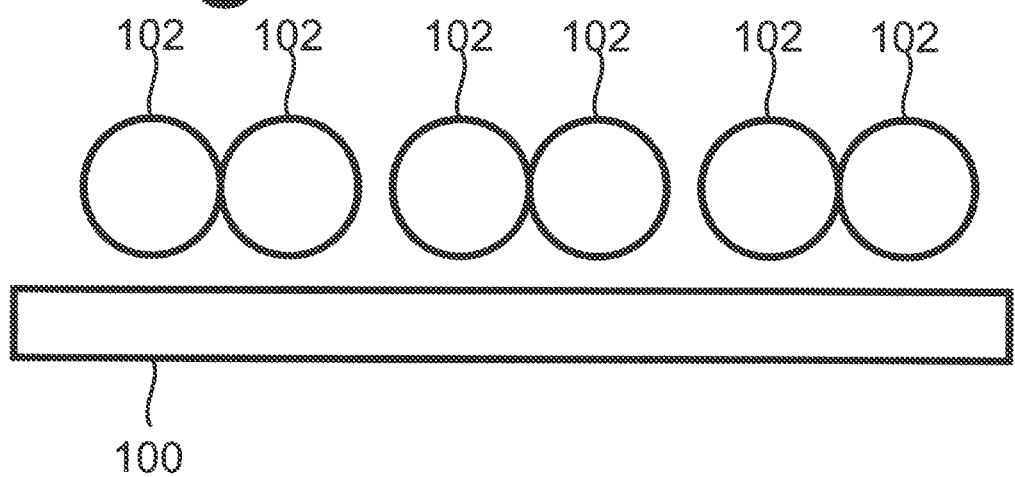

FIGS. 10a-d illustrate an embodiment of a processing station. The processing station includes a circulating discharge conveyor 100 (partly shown), pairs of rotatably arranged wheels 102 on discharge conveyor 100 and a winding binder 104 next to discharge conveyor 100. FIG. 10a shows a cross section in a plane perpendicular to the transport direction of discharge conveyor 100, with a twisted bundle 106 on discharge conveyor 100 for illustration. FIG. 10b shows a cross section transversely along the transport direction (z direction) of discharge conveyor 100. FIGS. 10c and 10d schematically show a top view from a direction perpendicular to the surface of discharge conveyor 110 and a side view respectively.

Winding binders, that is, binding machines which are configured to lay a plurality of windings around a bunch of stems, are known per se. Winding binder 104 is so arranged that the winding position, where winding binder 104 lays windings, is at a predetermined distance from the edge of discharge conveyor 100.

Pairs of wheels 102 stand at successive points on discharge conveyor 100, along the transport direction at the edge of discharge conveyor 100, with the axles of wheels 102 at the same height and transversely to the transport direction.

In use, the gripper 110 grips the bundle of stems with claws 112 between the first and second receiving units after twisting, moves as schematically indicated by the arrows, and the gripper 110 then places the bundle of stems on discharge conveyor 100. The gripper 110 positions the twisted bundle by the narrowest part of the twisted bundle 106 at the predetermined distance next to discharge conveyor 100, and presses the twisted bundle 106 between and through a pair of wheels 102. Winding binder 104 then winds a binding around the narrowest part of the twisted bundle 106 at the predetermined distance from discharge conveyor 100.

As shown in FIG. 10a, discharge conveyor 100 can have a raised portion 108 at the edge of discharge conveyor 100. The raised portion 108 makes it possible to support the twisted bundle 106 with the axis direction of the twisted bundle 106 in a more horizontal position, which simplifies winding. In addition, or instead, discharge conveyor 100 may slope down transversely to the transport direction to support bundle 106 over a larger surface with the axis of bundle 106 in a more horizontal position. Instead of a single belt with an elevation and/or oblique configuration, partial belts may be used. If use is made of the raised portion 108 at the edge of discharge conveyor 100, the pairs of wheels 102 preferably stand on the raised portion 108. But a horizontal position of the axis of the bundle is not always indispensable, and the raised portion and/or the oblique configuration can be omitted in that case.

Pairs of wheels 102 preferably have a resilient surface, such as a foam rubber surface, which is depressed by the bundle when the gripper pushes the bundle between and through a pair of wheels 102, and thereupon presses the bundle against (the raised portion 108 of) the discharge conveyor.

The invention claimed is:

1. A device for twisting a bundle of stems of bouquet components, comprising:
    a first rotatable receiving unit and a second rotatable receiving unit, each having rotation axes being at least substantially in line with the other, arranged to receive bouquet components lying, with a first axial part and a second axial part of the bouquet components, respectively, in the first rotatable receiving unit and the second receiving unit, while a part of each bouquet component, between the first axial part and the second axial part, extends over a distance between the first rotatable receiving unit and the second rotatable receiving unit,
    a first separating structure comprising a plurality of first separations extending in different radial directions relative to a first rotation axis of the first rotatable receiving unit, wherein the first separating structure is configured to keep the first axial part of the bouquet components at least partly separated from each other;
    a second separating structure comprising a plurality of second separations extending in different radial directions relative to a second rotation axis of the first rotatable receiving unit, wherein the second separating structure is configured to keep the second axial part of the bouquet components at least partly separated from each other;
    wherein the first separating structure and the second separating structure, at least at receiving of the first axial part and the second axial part of the bouquet components, are accessible laterally through a radial opening relative to the rotation axes for laterally radially receiving the first axial part and the second axial part;
    a first driving structure coupled to the first rotatable receiving unit and the second rotatable receiving unit, the first driving structure being configured to rotate the first rotatable receiving unit around the rotation axis between the receiving of different bouquet components, while the second receiving unit rotates substantially along with the first receiving unit, and thereupon to change a relative rotation angle between the first rotatable receiving unit and the second rotatable receiving unit;
    a second driving structure coupled to the first rotatable receiving unit and/or the second rotatable receiving unit, the second driving structure being configured to make space for taking out a bundle formed by the bouquet components in the first rotatable receiving unit and the second rotatable receiving unit.

2. The device according to claim 1, wherein
the first separating structure comprises first spaces at least partly separated from each other transversely to the axial direction relative to a rotation axis of the first receiving unit, the first spaces being configured to receive the first axial part of the bouquet components, the second separating structure comprises second spaces at least partly separated from each other transversely to the axial direction relative to a rotation axis of the second receiving unit, the second spaces being configured to receive the second axial part of the bouquet components, and the first driving structure is configured to rotate the first receiving unit around the rotation axis between the feeding of different bouquet components into the first spaces.

3. The device according to claim 1, wherein separations of the first separating structure are partition walls for keeping the first axial parts separated from each other.

4. The device according to claim 1, further comprising a retaining structure configured to prevent the bouquet components from, after rotation down, falling out of the first receiving unit and/or the second receiving unit.

5. The device according to claim 1, wherein the second driving structure is configured to temporarily enlarge a distance between the first rotatable receiving unit and the second rotatable receiving unit or parts of the first rotatable receiving unit and the second rotatable receiving unit to make space for taking out the bundle.

6. The device according to claim 2, wherein separations of the first rotatable receiving unit are walls for at least partial radial separation of the first spaces and at least one of the first spaces comprises a movable screening, wherein the movable screening is movable between a first position which leaves radial access to the first spaces open and a second position for screening off the at least one of the first spaces.

7. The device according to claim 6, wherein the movable screening includes a flap bendable between the first position and the second position.

8. The device according to claim 2, further comprising a support element arranged between the first rotatable receiving unit and the second rotatable receiving unit, the support element being configured for supporting bouquet components between the first rotatable receiving unit and the second rotatable receiving unit when the first spaces face down.

9. The device according to claim 2, further comprising a fixedly arranged, interrupted ring around the first spaces, concentric with the rotation axis of the first rotatable receiving unit, wherein the ring has an interruption for allowing bouquet components to pass radially from above the first spaces to the second spaces and is closed in positions lower than the rotation axis of the first rotatable receiving unit.

10. The device according to claim 2, wherein the first rotatable receiving unit comprises:
a hollow cylinder concentric with the rotation axis of the first rotatable receiving unit,
partition walls between the first spaces on an outer circumference of the hollow cylinder;
a movable valve in the hollow cylinder, the valve being movable between an open and a closed position, in which positions radial feed-through of a bouquet component to the inside of the cylinder is possible and is hindered, respectively.

11. The device according to claim 10, comprising a further separation between spaces within the cylinder.

12. The device according to claim 2, wherein the second rotatable receiving unit comprises a thickening around the rotation axis of the second rotatable receiving unit and separations between the spaces which project radially further than the thickening.

13. The device according to claim 12, comprising a ring around the rotation axis of the second rotatable receiving unit, the ring having a diameter greater than a diameter of the thickening, and the ring having an opening which allows radial introduction of ends of the stems or groups of stems of the bouquet components between the separations, wherein the ring is fixedly arranged so that the ring does not rotate along with the rotation axis of the second rotatable receiving unit.

14. The device according to claim 13, wherein the thickening has a resilient surface and a diameter such that the second axial parts of the bouquet components which are between the thickening and the ring are pressed against the ring by the thickening.

15. The device according to claim 14, wherein the ring includes a hinge, for folding out the ring away from the thickening.

16. The device according to claim 1, wherein the second receiving unit comprises:
a thickening around the rotation axis of the second rotatable receiving unit,
a press-on belt,
a mechanism configured to guide the press-on belt over a path which follows the circumference of the thickening, so that ends of the stems of the bouquet components are clamped between press-on belt and thickening, while the track leaves clear an opening which allows radial introduction of the ends of the stems or groups of stems through the opening to the thickening.

17. The device according to claim 16, comprising
a drive configured to drive the press-on belt at a speed that corresponds to the rotation speed of the thickening.

18. The device according to claim 13, comprising a mechanism to press the ends of the stems after laying-in of the stems in the opening radially against the thickening.

19. The device according to claim 1, comprising a stop plate transverse to the rotation axis of the second receiving unit, while the second separating structure is between the stop plate and the first receiving unit.

20. The device according to claim 19, comprising an adjustment structure configured to adjust a distance between the stop plate and the first rotatable receiving unit.

21. The device according to claim 19, comprising an automatic adjustment structure configured to automatically adjust a distance between the stop plate and the first receiving unit in combination with a change of a relative rotation angle between the first rotatable receiving unit and the second rotatable receiving unit upon the changing of the relative rotation angle between the first rotatable receiving unit and the second rotatable receiving unit.

22. The device according to according to claim 1, wherein the second rotatable receiving unit comprises an axially displaceable thickening around the rotation axis.

23. The device according to claim 1, comprising a gripper with claws for gripping the bundle of stems between the first rotatable receiving unit and the second rotatable receiving unit.

24. The device according to claim 23, comprising a processing station comprising a circular belt, pairs of wheels on the circular belt and a winding binder next to the circular belt, wherein the gripper is configured to position the bundle of stems between the wheels of a pair of wheels on the circular belt, with a narrowest part of the bundle at a predetermined distance from an edge of the circular belt that corresponds to a distance between the edge and a winding position of the winding binder.

25. The device according to claim 1, comprising a control unit coupled to the first driving structure and configured to switch successively to a first condition and a second condition,
- wherein while in the first condition to control the first driving structure to cause the first rotatable receiving unit to rotate at least stepwise around the rotation axis of the first rotatable receiving unit, while the second rotatable receiving unit rotates substantially along with the first rotatable receiving unit, and
- wherein while in the second condition to control the first driving structure to change a relative rotation angle of the first rotatable receiving unit and the second rotatable receiving unit relative to each other.

26. The device according to claim 25, comprising a detector for detection of stems upon feed of bouquet components to the receiving units, wherein the control unit is configured to control the first driving structure to cause the first rotatable receiving unit to rotate stepwise around the rotation axis of the first rotatable receiving unit in response to detection that a predetermined number of one or more bouquet components has been fed.

27. The device according to claim 1, comprising a conveyor belt for feeding the bouquet components to the first rotatable receiving unit and the second rotatable receiving unit, lying on the conveyor belt, with a length direction of the stem at least substantially perpendicular to the conveying direction of the conveyor belt.

28. The device according to claim 27, comprising a cutting structure configured to align ends of the stems of the bouquet components on the conveyor belt and/or upon transport from the conveyor belt to the receiving units, by cutting off an excess length of the stems.

29. A method for twisting stems of a bundle of bouquet components, using a first rotatable receiving unit and a second rotatable receiving unit, with rotation axes at least substantially in line with each other, each receiving unit comprising a separating structure comprising a plurality of separations extending in different radial directions relative to the rotation axis of the receiving unit, wherein the separating structure is configured to keep bouquet components at least partly separated from each other transversely to the axial direction relative to a rotation axis of the receiving unit, wherein the method comprises:
- laterally radially introducing a first axial part and a second axial part of each of a multiplicity of bouquet components by moving in a lateral radial direction through a radial opening relative to the rotation axes into the first rotatable receiving unit and the second rotatable receiving unit respectively, while a part of each bouquet component extends over a distance between the first rotatable receiving unit and the second rotatable receiving unit, the introducing causing the bouquet component to be positioned in a lying orientation parallel to the rotation axes;
- rotating the first receiving unit between the feeding of different bouquet components at the positions at least partly separated from each other transversely to the axial direction relative to a rotation axis of the first rotatable receiving unit, while the second rotatable receiving unit rotates substantially along with the first rotatable receiving unit;
- changing a relative rotation angle between the first rotatable receiving unit and the second rotatable receiving unit as a result of which the bundle of stems is twisted;
- gripping and/or binding of the stems in the twisted bundle after changing of the relative rotation angle;
- removing the gripped and/or bound bundle of stems from the first rotatable receiving unit and the second rotatable receiving unit.

30. The device according to claim 1, wherein:
- the separations of the first separating structure are partition walls;
- the first separating structure comprises first spaces at least partly separated from each other by the partition walls that extend transversely to the axial direction relative to a rotation axis of the first receiving unit, the first spaces being configured to receive the first axial part of the bouquet components, and
- the separations of the second separating structure are pins;
- the second separating structure comprises second spaces at least partly separated from each other by the pins that extend transversely to the axial direction relative to a rotation axis of the second receiving unit, the second spaces being configured to receive the second axial part of the bouquet components.

* * * * *